(12) United States Patent
Bringewatt et al.

(10) Patent No.: US 8,993,902 B2
(45) Date of Patent: Mar. 31, 2015

(54) METHOD FOR LOADING A LAUNDRY MACHINE BY ADJUSTING THE WEIGHT OF A BATCH OF LAUNDRY BASED ON THE VOLUME OF THE BATCH

(75) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 403 days.

(21) Appl. No.: 13/458,517

(22) Filed: Apr. 27, 2012

(65) Prior Publication Data

US 2012/0298427 A1 Nov. 29, 2012

(30) Foreign Application Priority Data

May 23, 2011 (DE) .......................... 10 2011 102 961
Jul. 30, 2011 (DE) .......................... 10 2011 109 014

(51) Int. Cl.
| | | |
|---|---|---|
| *D06F 95/00* | (2006.01) | |
| *D06F 35/00* | (2006.01) | |
| *D06F 31/00* | (2006.01) | |
| *G01G 19/42* | (2006.01) | |
| *D06F 93/00* | (2006.01) | |
| *G01G 19/00* | (2006.01) | |
| *G01G 19/40* | (2006.01) | |

(52) U.S. Cl.
CPC ................ *D06F 31/00* (2013.01); *G01G 19/42* (2013.01); *D06F 93/00* (2013.01); *G01G 19/00* (2013.01); *G01G 19/40* (2013.01); *D06F 95/00* (2013.01); *D06F 31/005* (2013.01)
USPC ........................................................... 177/1

(58) Field of Classification Search
CPC ....... D06F 93/00; D06F 93/005; D06F 31/00; D06F 31/005; D06F 95/00; G01G 19/40; G01G 19/42; G01G 19/00
USPC .......... 177/1, 126, 144, 160, 238, 245; 8/137; 414/13
See application file for complete search history.

(56) References Cited

U.S. PATENT DOCUMENTS

| | | | | |
|---|---|---|---|---|
| 1,520,372 A | * | 12/1924 | Syers ............................. | 177/160 |
| 1,749,746 A | * | 3/1930 | Guldbrandsen ............... | 177/160 |
| 2,069,499 A | * | 2/1937 | Marin et al. .................. | 177/238 |

(Continued)

FOREIGN PATENT DOCUMENTS

DE 10238358 A1 8/2003

OTHER PUBLICATIONS

European Patent Office search report for related European patent application (Aug. 6, 2012).

*Primary Examiner* — Randy W Gibson
(74) *Attorney, Agent, or Firm* — Laurence P. Colton; Smith Risley Tempel Santos LLC

(57) ABSTRACT

A method that makes provision for a volume of a batch of laundry to be ascertained in a water-removal press downstream of the washing machine. The volume of the batch of laundry can be reliably determined in a simple manner in the water-removal press, without the performance of the washing machine being adversely affected as a result. On the basis of the subsequently ascertained volume of the batch of laundry, the weight of the batches of laundry with which the washing machine is then to be loaded can be corrected such that the said batches of laundry and also subsequent batches of laundry have a volume which at least approximately corresponds to the receiving volume of the washing machine.

8 Claims, 1 Drawing Sheet

(56) References Cited

U.S. PATENT DOCUMENTS

| | | | | |
|---|---|---|---|---|
| 2,193,212 A | * | 3/1940 | Vincent | 116/334 |
| 2,210,851 A | * | 8/1940 | Davis | 68/13 R |
| 2,412,270 A | * | 12/1946 | Johnston | 312/234 |
| 2,631,839 A | * | 3/1953 | Howard | 177/47 |
| 2,656,236 A | * | 10/1953 | Wasemann | 312/234 |
| 2,685,441 A | * | 8/1954 | Baade | 177/126 |
| 3,101,802 A | * | 8/1963 | Kleinman | 177/144 |
| 3,248,911 A | * | 5/1966 | Kleinman | 68/13 R |
| 3,522,855 A | * | 8/1970 | Waseman | 177/144 |
| 5,253,380 A | * | 10/1993 | Lim et al. | 8/158 |
| 5,728,977 A | * | 3/1998 | Juday et al. | 177/25.17 |
| 2008/0295257 A1 | | 12/2008 | Bringewatt | |
| 2012/0099947 A1 | * | 4/2012 | Heinz et al. | 414/13 |
| 2013/0000141 A1 | * | 1/2013 | Ghosh et al. | 34/389 |

\* cited by examiner

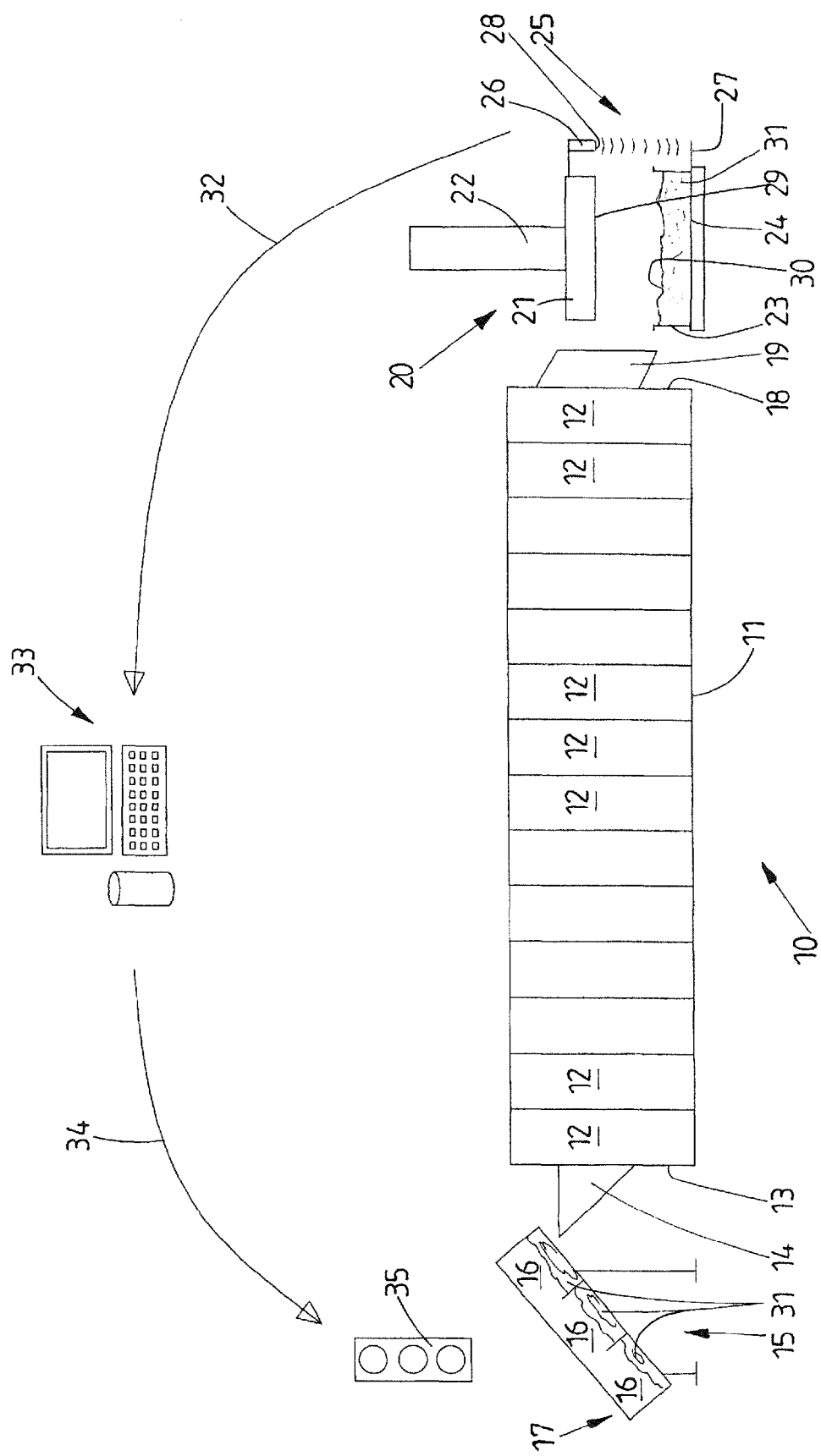

METHOD FOR LOADING A LAUNDRY MACHINE BY ADJUSTING THE WEIGHT OF A BATCH OF LAUNDRY BASED ON THE VOLUME OF THE BATCH

STATEMENT OF RELATED APPLICATIONS

This patent application claims the benefit of German Patent Application No. 10 2011 102 961.7 having a filing date of 23 May 2011 and German Patent Application No. 10 2011 109 014.6 having a filing date of 30 Jul. 2011.

BACKGROUND OF THE INVENTION

1. Technical Field

The invention relates to a method for loading a laundry machine, preferably a washing machine, with laundry, with the laundry being weighed before the laundry machine is loaded and then forming a batch of laundry which is suitable for loading the laundry machine and which has a specific weight.

2. Prior Art

Laundry machines, in particular washing machines, spin-dryers or the like, which are to be loaded with batches of laundry are usually designed for a specific receiving capacity. The receiving capacity of the laundry machine is usually related to the weight of the batch of laundry with which the laundry machine can be loaded for each operating cycle, for example for each washing process.

The volume of a batch of laundry is larger or smaller, given the same weight, depending on the type of laundry. In the case of lightweight but voluminous terry-towelling laundry, the batch of laundry has an above-average volume given a specific weight. The volume of the laundry is critical for correct treatment of the batch of laundry in the respective laundry machine. In the case of washing machines, a blockage, that is to say an obstruction, and/or batch displacement results when the batch of laundry has an excessively large volume, specifically particularly when transferring the laundry from one treatment chamber to the next treatment chamber of a tunnel-type washing machine. This can have an adverse effect on the washing result and, in extreme cases, lead to functional disturbances in the tunnel-type washing machine or another type of laundry machine. In order to prevent this, it would be expedient to use the volume, rather than the weight, of the batch of laundry which is to be treated to establish the capacity of a laundry machine. Since it appeared to be impossible to determine the volume of a batch of laundry up until now, the weight of a batch of laundry, which is comparatively simple to ascertain, has been used, as an alternative, as the capacity indicator for the laundry machines. In this case, for safety reasons, the weight of voluminous laundry, in particular terry-towelling laundry, which weight is relatively low in relation to the volume, was used in order to reliably prevent the laundry machine being loaded with a batch of laundry having an excessive volume. In the case of laundry with a relatively low volume in relation to the weight, this leads to only inadequate utilization of the capacity of the laundry machine in question.

BRIEF SUMMARY OF THE INVENTION

The invention is based on the object of providing a method for loading a laundry machine, in particular a washing machine, which allows for optimum capacity utilization of the laundry machine irrespective of the type of laundry to be treated, without the risks of the quality of treatment of the laundry being inadequate and functional disturbances in the laundry machine arising.

A method for achieving this object is a method for loading a laundry machine, preferably a washing machine, with laundry, with the laundry being weighed before the laundry machine is loaded and then a batch of laundry which is suitable for loading the laundry machine and which has a specific weight being formed, characterized in that the volume of the batch of laundry is ascertained in a water-removal press and compared with the receiving volume of the laundry machine, with the weight of at least one batch of laundry being adjusted on the basis of this comparison. Accordingly, the volume of the batch of laundry is ascertained in a water-removal press. This proceeds from the knowledge that the volume of a batch of laundry can be ascertained very well when this is done in a targeted manner in the water-removal press. Therefore, the invention departs from the assumption that the volume of the batch of laundry cannot be ascertained with a reasonable level of expenditure. Provision is further made for the ascertained volume of the batch of laundry to be compared with the receiving volume, in particular the optimum receiving volume, of the laundry machine. The weight of at least one batch of laundry is then adjusted on the basis of this comparison. As a result, a batch of laundry which corresponds to or at least comes very close to the optimum receiving volume of the laundry machine (desired volume) can be formed by simple, conventional weighing before loading.

If the laundry machine is a washing machine and the water-removal press is arranged downstream of the said washing machine, the volume of a batch of laundry with which the washing machine was previously loaded and which has also already been washed is ascertained. In this case, the weight of at least one such batch of laundry with which the washing machine is next or subsequently to be loaded, that is to say another, preferably subsequent, batch of laundry, is adjusted. However, if the laundry machine is, for example, a dryer which is arranged downstream of the water-removal press, the volume of the batch of laundry can be ascertained before the dryer is loaded with the said batch of laundry.

The receiving volume of the laundry machine is preferably compared with the volume of the batch of laundry which is ascertained in the water-removal press and a batch of laundry which has a greater weight is formed for loading the laundry machine if the receiving volume is undershot, while a batch of laundry which has a lower weight is formed if the receiving volume is exceeded. Provision is preferably made to establish a ratio between the receiving volume of the laundry machine and the measured volume of the batch of laundry and to multiply this ratio, as a factor, by the weight of the batch of laundry of which the volume has been ascertained in the water-removal press, in order to thus obtain a corrected weight for a batch of laundry with which the laundry machine will next be loaded, in order to form the next batch of laundry with an optimum weight. As a result, a weight of the batch, which weight leads to the optimum receiving volume of the laundry machines in relation to the type of laundry in the said batch, can be ascertained with close approximation.

According to a development of the method, the volume of the batch of laundry which is treated by the laundry machine is ascertained after the treatment in the water-removal press. This comes into consideration primarily if the laundry machine is a washing machine or a tunnel-type washing machine. In this case, the weight of at least a next batch of laundry with which the laundry machine, in particular washing machine, is intended to be loaded is then changed as a function of the ascertained volume of the treated batch of laundry such that the expected volume of this batch of laundry which is to be treated next corresponds to the receiving volume of the laundry machine, in particular the washing machine, or comes extremely close to the receiving volume of the laundry machine.

Furthermore, provision is preferably made, by measuring the volume of several or all of the batches of laundry iteratively in the water-removal press, in particular on the basis of several volume measurements, for the weight of the batch of laundry, in particular of a batch of laundry which is to be treated next or subsequently, to be changed or to be corrected such that the batches of laundry with which the laundry treatment machine is to be loaded next have a volume which corresponds or comes extremely close to the laundry receiving volume of the laundry machine. As a result, the weight of subsequent batches of laundry can be corrected in steps, without there being a risk of the laundry machine being loaded with a batch of laundry of which the volume exceeds the receiving volume of the laundry machine in the event of there being inhomogeneities between the laundry in different batches of laundry.

According to another advantageous refinement of the method, the process of matching the weight of the batch of laundry, in particular subsequent batches of laundry, for loading the laundry machine to the volume of the batch of laundry which is ascertained in the water-removal press is performed in relation to batches of laundry comprising laundry of a comparable type and/or having the same treatment criteria. This ensures that, when the type of laundry is changed, results of the volume measurement of specifically lightweight laundry are not used to form batches of laundry comprising specifically heavy laundry, this possibly resulting in the capacity not being utilized and, conversely, possibly resulting in overloading. This procedure can expediently be realized by the preceding volume measurements being used to form batches of laundry comprising laundry of the same type, and this can be ensured on the basis of the respective treatment program.

An advantageous development of the method makes provision for the volume of the batch of laundry to be ascertained in the water-removal press when a pressing ram or pressing piston of the water-removal press is extended into a pressing basket, which accommodates the batch of laundry, until a lower face of the pressing ram comes into contact with the laundry in the pressing basket. The laundry is then still not yet compressed and water has still not yet been removed in the water-removal press, as a result of which the actual volume of the batch of laundry can be determined. The volume of the batch of laundry is then ascertained in a state in which the batch of laundry has been loaded into the laundry machine.

Provision is preferably made to ascertain the volume of the batch of laundry in the water-removal press as soon as the pressing piston exerts a defined pressure, in particular admission pressure, on the batch of laundry in the pressing basket. The defined pressure can be the pressure, specifically atmospheric pressure, which prevails in the interior of an elastically deformable hollow body (a so-called diaphragm) beneath the pressing piston or a pressure, specifically hydraulic oil pressure, in the hydraulic cylinder of the pressing piston for compressing the laundry. This pressure is in the range of from 0.5 bar to 10 bar, preferably 0.5 bar to 5 bar, depending on the type of laundry. The lower face of the pressing piston then exerts a low pressure on the batch of laundry in the pressing basket, this leading to the items of laundry at the top of the batch of laundry being pressed down to a certain extent and, in the process, the top of the batch of laundry in the pressing basket being, as it were, smoothed. This leads to a relatively accurate, significant determination of the volume of the batch of laundry in the water-removal press, with non-uniform filling of the laundry of the batch of laundry in the pressing basket being compensated for, in particular individual items of laundry which are sticking out not corrupting the volume measurement in the water-removal press.

In an advantageous method, the volume of the batch of laundry in the water-removal press is ascertained by multiplying the inner cross-sectional area or base area of the pressing basket by the distance of the lower face of the pressing ram, which lower face comes into contact with the batch of laundry, from a lower face of the pressing basket or by a lowering movement of the pressing piston out of its starting position, which lowering movement is proportional to the said distance. The volume of the batch of laundry in the water-removal press can therefore be ascertained in a reliable manner by a relatively simple movement measurement. Incidentally, water-removal presses already have measurement sensors for the movement of the pressing ram, which measurement sensors are used for other purposes. These measurement sensors can also be used to determine the volume of the batch of laundry with the aid of the dimensions of the pressing basket and the positioning of the measurement sensors relative to the lower face of the pressing ram. In this case, the method according to the invention may be employed without modifying the water-removal press.

The method may be developed in such a way that, on the basis of the volume measurement in the water-removal press, adjusted or corrected weights for batches of laundry which are, in particular, to be subsequently loaded into the laundry machine and treated are stored based on the respective type of laundry and/or the relevant treatment program. This storage process is preferably performed based on the respective treatment program, for example a washing program in a washing machine. If the corresponding washing program is called up when the type of laundry is changed, the measurement values which were previously ascertained for laundry of the same type are available again. These previous measurement values can then be used to later again load the laundry machine with batches of laundry comprising laundry of the relevant type. As a result of previous values being stored, the previously ascertained values for optimum loading of the laundry machine are available again to each washing program, specifically even for the first batch of laundry of a newly selected washing program when the volume measurement of the batch of laundry is performed after the treatment of the said batch of laundry in, for example, a washing machine. By virtue of subsequent volume measurements, only relatively small deviations in the volume of the respective batch of laundry need to be ascertained to find the receiving volume of the laundry machine. Fine adjustments or readjustments of the weight of the next batch of laundry can then be made on the basis of the following volumes of a batch or preferably several batches of laundry which are measured during the same washing program, as a result of which deviations in the laundry density of different bundles of laundry can be eliminated by the method according to the invention in spite of the treatment with the same treatment program.

BRIEF DESCRIPTION OF THE DRAWING

A preferred exemplary embodiment of the invention will be explained in greater detail below with reference to the drawing. To this end, the single FIGURE in the drawing schematically shows a laundry machine which is in the form of a tunnel-type washing machine and has a downstream water-removal press for measuring the volume of the batch of laundry which is respectively being treated in the tunnel-type washing machine.

DETAILED DESCRIPTION OF PREFERRED EMBODIMENTS

The invention will be explained in the text which follows in conjunction with a laundry machine which is in the form of a washing machine. The washing machine 10 is a tunnel-type washing machine, which is only schematically illustrated, having a rotationally drivable drum 11 in which several chambers 12 which follow one another in the treatment direction are formed. At a front loading end 13, the washing machine 10 has a loading funnel 14. The washing machine 10 is loaded with a batch of laundry 31 via the loading funnel 14. The batch of laundry 31 is dimensioned such that it corresponds to the capacity of all of the successive chambers 12 of the washing machine 10.

A loading conveyor 15 is provided upstream of the loading end 13 of the washing machine 10 for the purpose of mechanical loading. The loading conveyor 15 allows the weight of the laundry which is located on the loading conveyor 15 to be ascertained. To this end, the loading conveyor 15 is situated on weight sensors, for example. The loading conveyor 15 has a conveyor belt which can be driven in a circulating manner, in particular a pocket conveyor belt having a plurality of successive pockets 16 for accommodating several items of laundry in each case. The loading conveyor 15 is arranged upstream of the washing machine 10 in such a way that it transports the laundry from a lower charging end 17, obliquely upwards, into the loading funnel 14. The laundry is weighed by the weight sensors in the process. The laundry is manually transferred to the charging end 17 of the loading conveyor 15 preferably by operators (not shown). However, the laundry can also be supplied to the charging end 17 of the loading conveyor 15 by conveyors (not shown).

As an alternative to the loading conveyor 15, it is feasible to supply the laundry to the washing machine 10 in another way and to perform loading thus. By way of example, the laundry can be supplied to the loading funnel 14 in batches from laundry bags.

The fully washed laundry leaves the washing machine 10 via a rear unloading end 18 which is situated opposite the loading end 13. The unloading end 18 has an associated unloading chute 19 with which a fully washed batch 31 of laundry can be transported out of the last chamber 12 of the washing machine 10.

A water-removal press 20 is located downstream of the washing machine 10. The batch 31 of laundry which is washed in the washing machine 10 can be transferred via the unloading chute 19, either directly or by means of an interposed conveyor, to the water-removal press 20.

The water-removal press 20 (only schematically illustrated in the FIGURE) has a pressing ram 21 which can be moved upwards and downwards by a hydraulic cylinder 22. The water-removal press 20 also has a pressing basket 23. The pressing basket 23 is formed in a corresponding manner to the pressing ram 21 in such a way that the pressing ram 21 can move into the pressing basket 23 from above and, in the process, the laundry of an entire batch 31 of laundry, which laundry originates from the washing machine 10, can be compressed and water can be removed therefrom. The pressing basket 23 rests on a support 24. The support 24 may be a circulating belt conveyor, with the pressing basket 23 together with the batch 31 of laundry located therein resting on the upper run of the said belt conveyor. The batch of laundry can be transported away from the region of the water-removal press 20 by the conveyor after the water has been removed. In addition, the support 24, in particular the upper run of the conveyor, can be liquid-permeable for the purpose of discharging liquid which is pressed out of the batch 31 of laundry, for example rinse liquid and/or final wash liquid which is bound in the laundry.

The water-removal press 20 has a distance-measuring device 25 with which the distance of the pressing ram 21 from the lower face of the pressing basket 23 or the support 24 can be determined. The distance-measuring device 25, which operates in a contactless manner for example, has a signal transmitter 26 on the pressing ram 21 which can be moved upwards and downwards and has a preferably stationary signal receiver 27 in the plane of the support 24 which comes to rest beneath the pressing basket 23. In the exemplary embodiment shown, a lower reference end 28 of the signal transmitter 26 is situated in the same plane in which a preferably flat lower face 29 of the pressing ram 21 is located. In this way, the distance between the lower face 29 of the pressing ram 21, which lower face comes into contact with the top 30 of the batch 31 of laundry in the pressing basket 23, and the lower face of the pressing basket 23 or the support 24 can be ascertained by the distance-measuring device 25 in a contactless manner, for example in accordance with the ultrasound principle.

It is also feasible to arrange the signal transmitter 26 and/or the signal receiver 27 of the distance-measuring device 25 in other positions on the pressing ram 21 and the pressing basket 23 or support 24, provided that this position does not change relative to the pressing ram 21 which can be moved upwards and downwards and relative to the pressing basket 23 or the support 24. The distance between the lower face 29 of the pressing ram 21 and the support 24 which forms a kind of base of the pressing basket 23, for example an upper run of the conveyor which forms the support 24, can always be ascertained by calculation on account of the unchanging fixed distances of the signal transmitter 26 and the signal receiver 27 from the lower face 29 of the pressing ram 21 and from the lower face of the pressing basket 23 or the upper face of the support 24. The invention can also be carried out with other, conventional distance-measuring devices.

The distance-measuring device 25 is connected to the control system of the washing machine 10 or another laundry machine via a data line 32. The control system contains a computer and a memory for preferably several measurement values from the distance-measuring device 25 and predefinable setpoint values, in particular the nominal weight of each batch 31 of laundry and the receiving volume of the washing machine 10, in particular a chamber 12 if all the chambers 12 have the same receiving volume, or the receiving volume of the smallest chamber 12 if not all the chambers 12 have the same receiving volume. The control system 33 is linked to a visual display device, which is in the form of a kind of traffic light 35 in the exemplary embodiment shown, via a further data line 34. The traffic light 35 shows an operator who is transferring the laundry onto the loading conveyor 15 at the charging end 17 whether the batch 31 of laundry exhibits the desired weight by, for example, a green light indicating that the batch 31 of laundry has not yet reached the desired weight and the yellow light indicating that the desired weight of the batch 31 of laundry has almost been reached and the red light indicating to the operator that no further laundry can be transferred onto the loading conveyor 15 because the batch of laundry has reached its predefined weight.

The method according to the invention will be explained in the text which follows with reference to the above-described washing machine 10 and the water-removal press 20 which is arranged downstream of the said washing machine:

In the text which follows, it is assumed that no volume measurement values from previous measurements of the volume of the batch 31 of laundry in the water-removal press 20 are yet stored in the control system 33. The control system 33 therefore contains only various laundry-specific washing programs, the nominal weight of the batch 31 of laundry with which the washing machine 10, in particular the respective chamber 12 of the said washing machine, can be loaded, and the receiving volume, which is the same for each chamber 12, or the receiving volume of the smallest chamber 12. The receiving volume corresponds to the volume of the batch 31 of laundry with which the machine 10 can be loaded to the maximum extent without adversely affecting the laundry quality and functioning.

When the washing machine 10 is loaded for the first time, a batch 31 of laundry of which the weight corresponds to the nominal weight of the loading of the washing machine 10 is formed. The nominal weight is generally the same for all washing programs, as is the receiving volume. While the receiving volume has to be the same in all washing programs because it is critical to avoid a risk of blockages and batch displacement, the weight of the batch of laundry can differ in individual washing programs because the laundry has different densities depending on the type of laundry. For example, terry-towelling laundry has a lower weight per unit volume or relative density in comparison to flat laundry.

The operator charges the loading conveyor 15 with laundry only until the traffic light 35 shows, by means of a red light, that the batch 31 of laundry has reached the nominal weight which was initially stored in the control system 33. The washing machine 10 is now loaded with the batch 31 of laundry which is at the nominal weight by the loading conveyor 15 via the loading funnel 14.

Once the batch of laundry has passed through all the chambers 12 of the drum 11 of the washing machine 10, the washed batch 31 of laundry is unloaded from the washing machine 10 via the unloading chute 19 and, when the pressing ram 21 is moved upwards, transferred to the pressing basket 23 of the water-removal press 20. Now, before water is removed from the batch 31 of laundry in or by the water-removal press 20, the volume of the batch 31 of laundry from which water has not yet been removed is ascertained in the water-removal press 20, in particular in the pressing basket 23 of the said water-removal press.

The volume of the batch 31 of laundry is ascertained by means of the water-removal press 20 when the pressing ram 21 is moved downward onto the laundry of the batch 31 of laundry in the pressing basket 23, specifically at a time at which the pressing ram 21 has been moved downwards by the hydraulic cylinder 22 so far onto or into the pressing basket 23 that the lower face 29 of the pressing ram 21 comes into contact with the laundry on the top of the batch 31 of laundry in the pressing basket 23. In particular, the volume of the batch 31 of laundry in the pressing basket 23 is ascertained at a time at which the pressing ram 21 exerts a defined admission pressure on the batch 31 of laundry. This defined admission pressure can preferably be exerted by the pressing ram 21 on the top 30 of the batch 31 of laundry when the admission pressure, with which the lower face 29 of the pressing ram 21, preferably an elastically deformable hollow body which is arranged below the said pressing ram and is composed of rubber or the like, a so-called membrane, is pressed onto the laundry of the batch 31 of laundry, is between 0.5 bar and 10 bar, in particular approximately 0.5 bar to 5 bar. This admission pressure can be parameterized in relation to different types of laundry, in particular types of fabric of the laundry. As a result, laundry of different types can be subjected to the action of an admission pressure which is optimum for the volume measurement. At the time at which the lower face 29 of the pressing ram 21 makes contact with the top 30 of the laundry in the batch 31 of laundry in the pressing basket 23, in particular exerts a defined pressure on the top 30 of the batch 31 of laundry, the distance-measuring device 25 ascertains the distance between the lower face 29 of the pressing ram 21 and the upper face of the support 24 on which the lower face of the pressing basket 23 rests. As an alternative, a distance measurement can be ascertained, this being proportional to the distance between the lower face 29 of the pressing ram 21 and the support 24 on which the pressing basket 23 rests. This distance measurement can then be used to ascertain the height of the batch 31 of laundry in the pressing basket 23. This height of the batch 31 of laundry in the pressing basket 23 provides, when multiplied by the inside cross section or the inside surface area of the pressing basket 23, the volume of the batch 31 of laundry from which water has not yet been removed and therefore has not been compressed or has not been significantly compressed, and therefore corresponds to the actual volume of the batch 31 of laundry.

The actual volume of the batch 31 of laundry which is ascertained in the water-removal press 20 is now compared, in the control system 33, with the receiving volume, which is stored in the control system 33, of the chambers 12 or the smallest chamber 12 of the washing machine 10. The computer of the control system 33 now ascertains the quotient of the nominal volume and the volume which is measured in the water-removal press 20. This quotient provides a correction factor for changing the weight of the batch 31 of laundry with which the washing machine 10 will next be loaded. If the correction factor is greater than 1, that is to say the receiving volume is greater than the measured volume of the batch 31 of laundry, the weight of the batch 31 of laundry which is to be loaded into the washing machine 10 and is to be formed next is increased, specifically multiplied by the correction factor. Conversely, with a correction factor of less than 1, when the nominal volume is lower than the measured volume, the weight of the next batch 31 of laundry is reduced by multiplication by the lower correction factor.

In order to prevent the case in which the measured volume exceeds the receiving capacity from occurring, the nominal weight of the batch 31 of laundry, which nominal weight is to be input into the control system 33, is selected such that the receiving capacity which leads to blockages and batch displacement is reliably prevented from being reached in every washing program, even in the case of a batch 31 of laundry comprising highly voluminous items of laundry.

The volume of the batch 31 of laundry in the water-removal press 20 and subsequent batches of laundry 31 is measured in the above-described manner. In this way, correction factors for changing the weight of the batch 31 of laundry with which the washing machine 10 is to be next loaded are gradually ascertained. In this way, the weight of the batch 31 of laundry which is to be next charged is successively or iteratively corrected with respect to the loading of the washing machine 10 with batches 31 of laundry of which the volume corresponds as accurately as possible to the receiving volume of the chambers 12 of the washing machine 10. The results of the successive measurement of different batches 31 of laundry in the water-removal press 20 and/or the correction factors ascertained in the process are all preferably stored in the control system 33.

It is feasible to statistically evaluate several volume measurement values or correction factors, in particular by calculating an average. Therefore, by virtue of continuous correction of the weights of successive batches 31 of laundry, the maximum receiving volume of the chambers 12 of the washing machine 10 can be utilized, specifically also possibly in an anticipatory manner. In addition, it is possible, by virtue of the statistical evaluation, to take into consideration fluctuations in the composition of the laundry in batches 31 of laundry for the same washing program by the volume of newly formed batches 31 of laundry not exceeding the receiving volume, in particular nominal volume, of the chambers 12 of the washing machine 10.

The above-described procedure is carried out for each washing program, with the volume values for the batches 31 of laundry containing washed laundry, which volume values are ascertained in the water-removal press 20, being stored in the control system 33 in each case for the relevant washing program. As a result, correction values for the weight of batches of laundry which are to be newly formed are equally available at the start of each washing program by using correction values which were stored on the basis of batches 31 of laundry of which the volume was ascertained in the water-removal press 20 when batches 31 of laundry were previously washed with the same washing program.

LIST OF REFERENCE SYMBOLS

10 Washing machine
11 Drum
12 Chamber
13 Loading end
14 Loading funnel
15 Loading conveyor
16 Pocket
17 Charging end
18 Unloading end
19 Unloading chute
20 Water-removal press
21 Pressing ram
22 Hydraulic cylinder
23 Pressing basket
24 Support
25 Distance-measuring device
26 Signal transmitter
27 Signal receiver
28 Reference end
29 Lower face
30 Top
31 Batch of laundry
32 Data line
33 Control system
34 Data line
35 Traffic light

What is claimed is:

1. A method for loading a laundry washing machine (10), with laundry, comprising:
    a) weighing the laundry before the laundry machine is loaded;
    b) forming a batch (31) of laundry which is suitable for loading the laundry machine and which has a specific weight;
    c) ascertaining the volume of the batch (31) of laundry in a water-removal press (20) downstream of the laundry machine;
    d) changing the weight of at least one other batch (31) of laundry that is intended to be loaded into the laundry machine as a function of the volume of the treated batch (31) of laundry ascertained in step c) such that the expected volume of the at least one other batch (31) of laundry at least largely corresponds to the receiving volume of the laundry machine; and
    e) comparing the volume of the batch (31) of laundry with a receiving volume of the laundry machine, with the weight of at least one batch (31) of laundry being adjusted on the basis of this comparison.

2. The method according to claim 1, wherein the comparison is made to determine whether the receiving volume of the laundry machine corresponds to the volume of the batch (31) of laundry which is ascertained in the water-removal press (20) and batches of laundry which have a greater weight are formed if the receiving volume is undershot, and batches (31) of laundry which have a lower weight are formed if the receiving volume is exceeded.

3. The method according to claim 1, wherein, by measuring the volume of several or all of the batches (31) of laundry iteratively in the water-removal press (20) on the basis of the results of the volume measurements of several different batches (31) of laundry, the weight of subsequent batches (31) of laundry is changed in order to form subsequent batches (31) of laundry with a volume which corresponds or at least approximately corresponds to the receiving volume of the laundry machine.

4. The method according to claim 3, wherein the process of matching the weight of subsequent batches (31) of laundry for loading the laundry machine to the volume of the batch (31) of laundry which is ascertained in the water-removal press (20) is performed in retrospect in relation to batches (31) of laundry comprising laundry of the same type and/or having the same treatment criteria.

5. The method according to claim 1, wherein the volume of the batch (31) of laundry is ascertained in the water-removal press (20) when a pressing ram (21) of the water-removal press (20) is extended into a pressing basket (23) which accommodates the batch (31) of laundry until a lower face (29) of the pressing ram (21) comes into contact with the laundry at the top in the pressing basket (23).

6. The method according to claim 5, wherein the volume of the batch (31) of laundry is ascertained as soon as the pressing ram (21) exerts a defined pressure or admission pressure of 0.5 bar to 10 bar on the batch (31) of laundry in the pressing basket (23).

7. The method according to claim 5, wherein the volume of the batch (31) of laundry in the water-removal press (20) is ascertained by multiplying the inner cross-sectional area or base area of the pressing basket (23) by the distance of the lower face (29) of the pressing ram (21), which lower face comes into contact with the laundry, from a lower face of the pressing basket (23) or a support (24) on which the pressing basket (23) rests, or by a lowering movement of the pressing ram (21) out of its starting position, which lowering movement is proportional to the said distance.

8. The method according to claim 1, wherein, on the basis of the volume measurement in the water-removal press (20), adjusted or corrected weights for batches (31) of laundry which are to be subsequently loaded into the laundry machine are stored based on the respective type of laundry and/or the relevant treatment program of the at least one batch (31) of laundry which is subject to the volume measurement, and are used to determine the weight of at least one other or subsequent batch (31) of laundry which is to be loaded into the laundry machine and comprises the same type of laundry and/or with the same washing program.

* * * * *